US012315689B2

(12) United States Patent
Delachaux et al.

(10) Patent No.: US 12,315,689 B2
(45) Date of Patent: May 27, 2025

(54) SWITCH SYSTEM

(71) Applicant: ABB Schweiz AG, Baden (CH)

(72) Inventors: Thierry Delachaux, Zürich (CH); Ralf-Patrick Suetterlin, Baden (CH); Pierre Corfdir, Wettingen (CH); Felix Theodor Erich Rager, Kleindöttingen (CH)

(73) Assignee: ABB Schweiz AG, Baden (CH)

( * ) Notice: Subject to any disclaimer, the term of this patent is extended or adjusted under 35 U.S.C. 154(b) by 236 days.

(21) Appl. No.: 17/991,116

(22) Filed: Nov. 21, 2022

(65) Prior Publication Data

US 2023/0122117 A1 Apr. 20, 2023

Related U.S. Application Data

(63) Continuation of application No. PCT/EP2021/063516, filed on May 20, 2021.

(30) Foreign Application Priority Data

May 22, 2020 (EP) .................................... 20176059
Sep. 8, 2020 (EP) .................................... 20195134
(Continued)

(51) Int. Cl.
*H01H 33/28* (2006.01)
*H01H 3/22* (2006.01)

(52) U.S. Cl.
CPC .......... *H01H 33/285* (2013.01); *H01H 3/222* (2013.01)

(58) Field of Classification Search
CPC ...... H01H 33/285; H01H 3/222; H01H 9/542; H01H 1/20; H01H 33/40; H01H 71/125;
(Continued)

(56) References Cited

U.S. PATENT DOCUMENTS 2,897,408 A 7/1959 Kesselring et al.
2003/0179525 A1 9/2003 Baginski et al.
(Continued)

FOREIGN PATENT DOCUMENTS

DE 3642136 A1 6/1988
DE 102004056283 A1 6/2006
(Continued)

OTHER PUBLICATIONS

Hátsági, "Electromagnetic modelling and testing of a Thomson coil based actuator," Master's thesis, *KTH Royal Institute of Technology; School of Electrical Engineering*, 79 pp. (Jun. 2017).
(Continued)

*Primary Examiner* — Mohamad A Musleh
*Assistant Examiner* — Lisa N Homza
(74) *Attorney, Agent, or Firm* — Leydig, Voit & Mayer, Ltd.

(57) ABSTRACT

A switch system includes a mechanical switch for electrical currents. The mechanical switch operates in a conductive state and in a non-conductive state. A first actuator is configured to change the state of the mechanical switch, wherein an actuation of the first actuator is based on a Thomson coil system. A second actuator is also configured to change the state of the mechanical switch and includes a loaded spring system locked by a latch system. Each of the first and second actuators is configured to change the state of the mechanical switch depending on a property of an electrical current passing through the mechanical switch.

14 Claims, 4 Drawing Sheets

(30) Foreign Application Priority Data

Dec. 15, 2020 (EP) .................................... 20214239
Dec. 15, 2020 (EP) .................................... 20214242

(58) Field of Classification Search
CPC ............... H01H 71/16; H01H 71/2454; H01H 2003/3089; H01H 2009/543; H01H 2009/544; H01H 3/30
USPC ........................................................ 335/147
See application file for complete search history.

(56) References Cited

U.S. PATENT DOCUMENTS

| | | | | |
|---|---|---|---|---|
| 2012/0218676 | A1 | 8/2012 | Demetriades et al. | |
| 2015/0235784 | A1* | 8/2015 | Karlstrom ................ | H01H 1/50 218/140 |
| 2017/0154747 | A1* | 6/2017 | Bissal .................... | H01H 50/02 |

FOREIGN PATENT DOCUMENTS

| | | | |
|---|---|---|---|
| EP | 2871651 | A1 | 5/2015 |
| FR | 2733353 | A1 | 10/1996 |
| GB | 2022346 | A | 12/1979 |
| WO | WO 2014/048483 | A1 | 4/2014 |
| WO | WO 2015/172824 | A1 | 11/2015 |
| WO | WO 2020/055317 | A1 | 3/2020 |

OTHER PUBLICATIONS

Li et al., "Optimal Shape Design of a Thomson-Coil Actuator Utilizing Generalized Topology Optimization Based on Equivalent Circuit Method," *IEEE Transactions on Magnetics*, 47(5): 1246-1249 (May 2011).

Li et al., "Shape Optimization of a Thomson Coil Actuator for Fast Response Using Topology Modification," *J. of Electrical Engineering and Technology* (*JEET*), 7(1): 58-63 (2012).

Vilchis-Rodriguez et al., "Double-sided Thomson coil based actuator: finite element design and performance analysis," *8th IET International Conference on Power Electronics, Machines and Drives* (*PEMD 2016*), 6 pp. (Apr. 19-21, 2016).

European Patent Office, Extended European Search Report in European Patent Application No. 20214239.4, 9 pp. (Jun. 14, 2021).

European Patent Office, Extended European Search Report in European Patent Application No. 20214242.8, 6 pp. (Jun. 18, 2021).

European Patent Office, International Search Report in International Patent Application No. PCT/ EP2021/063516, 5 pp. (Jul. 26, 2021).

European Patent Office, Written Opinion in International Patent Application No. PCT/EP2021/063516, 7 pp. (Jul. 26, 2021).

European Patent Office, International Search Report in International Patent Application No. PCT/EP2021/063520, 4 pp. (Aug. 12, 2021).

European Patent Office, Written Opinion in International Patent Application No. PCT/EP2021/063520, 6 pp. (Aug. 12, 2021).

* cited by examiner

SWITCH SYSTEM

CROSS-REFERENCE TO RELATED APPLICATIONS

This patent application claims priority to International Patent Application No. PCT/EP2021/063516, filed on May 20, 2021, and to European Patent Application No. 20176059.2, filed on May 22, 2020, European Patent Application No. 20195134.0, filed on Sep. 8, 2020, European Patent Application No. 20214239.4, filed on Dec. 15, 2020, and to European Patent Application No. 20214242.8, filed on Dec. 15, 2020, each of which is incorporated herein in its entirety by reference.

FIELD OF THE DISCLOSURE

The present disclosure relates to a switch system comprising actuators based on a Thomson coil system and a spring system.

BACKGROUND OF THE INVENTION

Thomson coil systems represent a class of fast actuators that have been developed for switching operations. Thomson coil systems typically comprise a flat coil with a conductive plate parallel to the flat coil. A current flowing through the coil creates a magnetic field that induces eddy currents into the plate, leading to large repulsive electromagnetic forces that can be used for actuation. In particular, in switching applications, these forces are used to promptly separate contacts of the mechanical switch. The coil of the Thomson coil system may be driven by an active or passive electronic circuitry.

The idea of a passive Thomson coil based actuator is to be triggered by using the energy of the fault current, i.e. by directly using the current change rate dI/dt of the fault current to generate the motion of the conductive plate. This method is thus instrumental in reducing the delay between the fault initiation and the contact separation of the mechanical switch. Therefore, the acceleration of the conductive plate is a function of the change rate of the current dI/dt.

BRIEF SUMMARY OF THE INVENTION

In this entire description of the invention, some features are provided with counting words to improve readability or to make the assignment more clear, but this does not imply the presence of certain features.

To achieve these and other advantages and in accordance with the purpose of the invention, as embodied and broadly described herein, there is provided a switch system, comprising a mechanical switch for electrical currents, comprising a conductive state and a nonconductive state. The switch system further comprising a first actuator configured to change the state of the mechanical switch, wherein an actuation of the first actuator is based on a Thomson coil system. The switch system further comprising a second actuator configured to change the state of the mechanical switch comprising a loaded spring system locked by a latch system and wherein the first actuator and the second actuator each are configured to change the state of the mechanical switch depending on a property of an electrical current passing through the mechanical switch.

BRIEF DESCRIPTION OF THE SEVERAL VIEWS OF THE DRAWING(S)

Figure 6A:
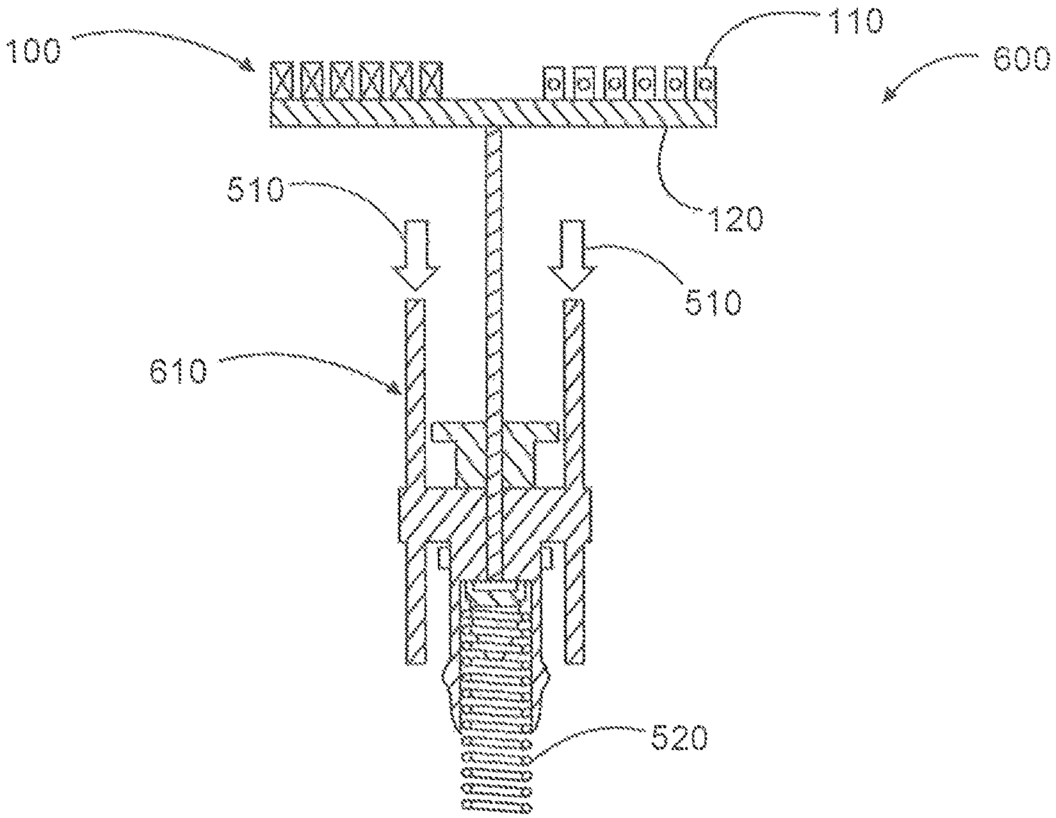
Figure 6B:
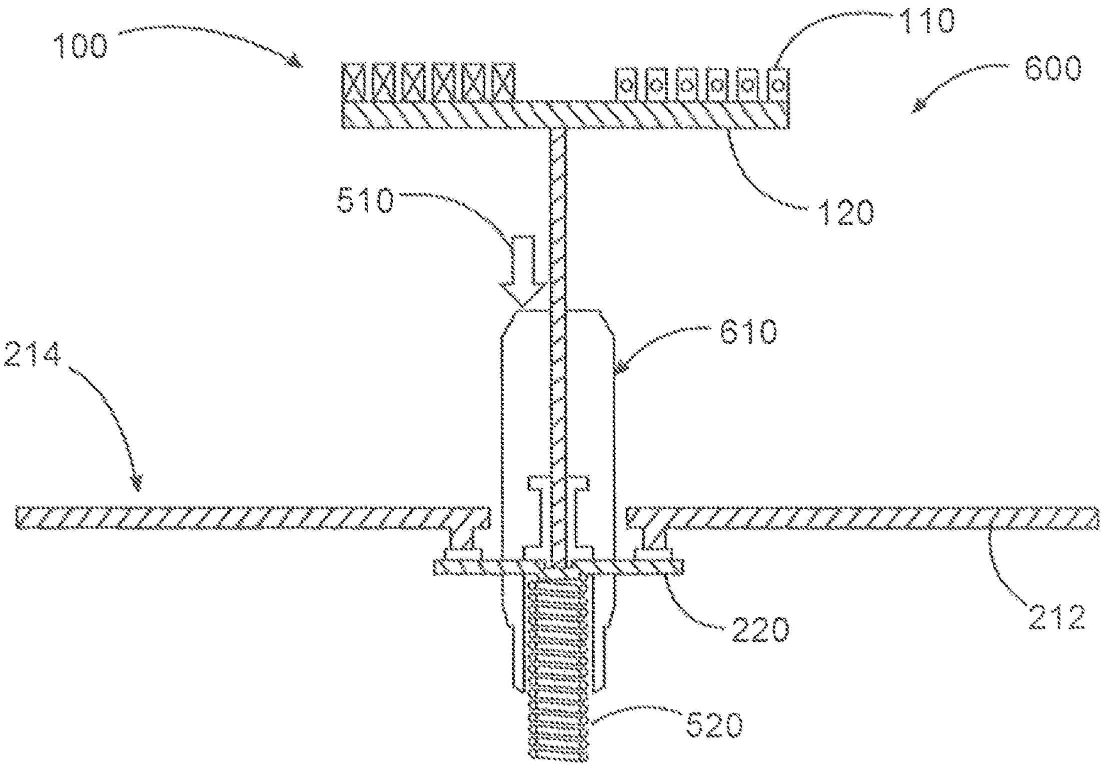

FIGS. 6*a* and 6*b* are sectioned schematic drawings of an alternative embodiment for a switch system in accordance with the disclosure, which are drawn from different directions perpendicular to each other.

Figure 7A:
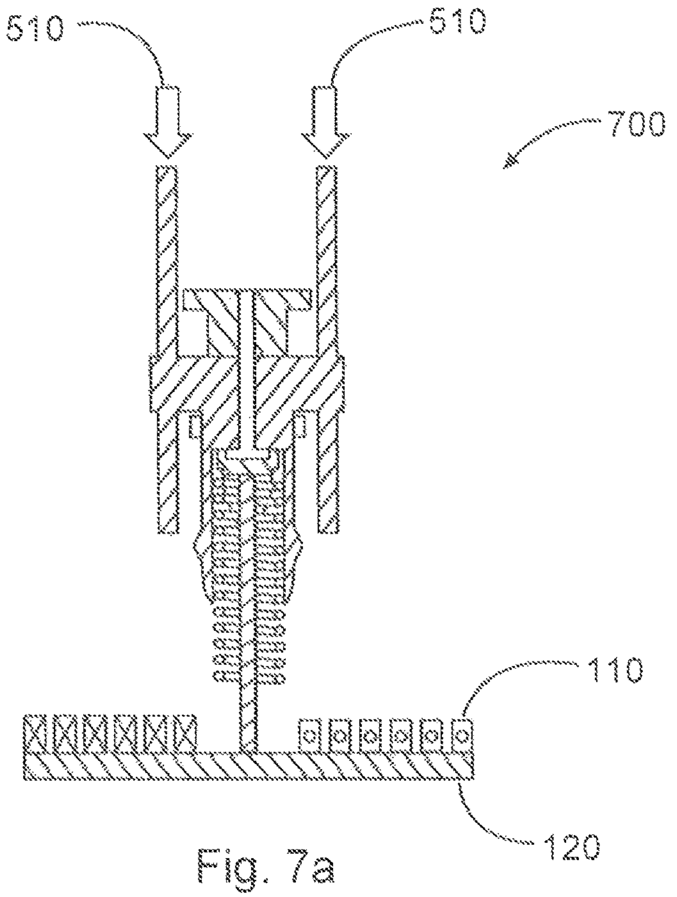
Figure 7B:
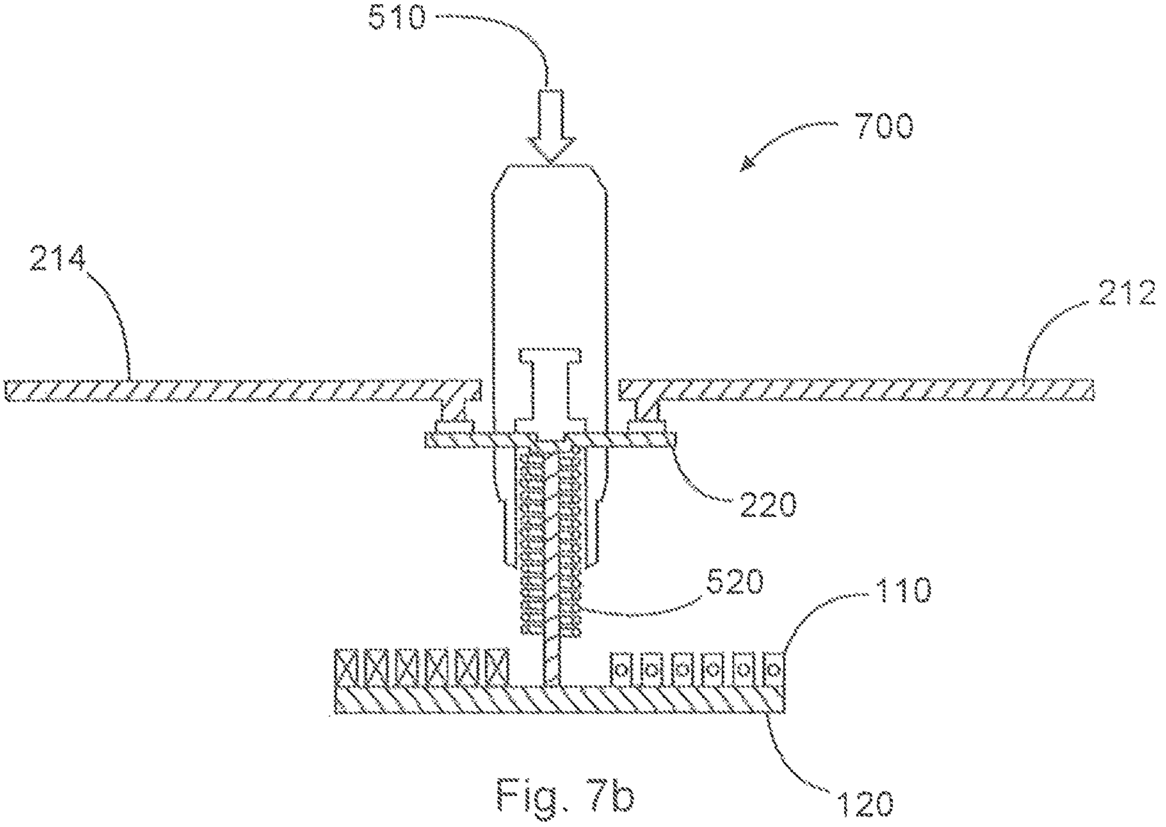

FIGS. 7*a* and 7*b* are sectioned schematic drawings of another alternative embodiment for a switch system in accordance with the disclosure, which are drawn from different directions perpendicular to each other.

DETAILED DESCRIPTION OF THE INVENTION

Figure 1:
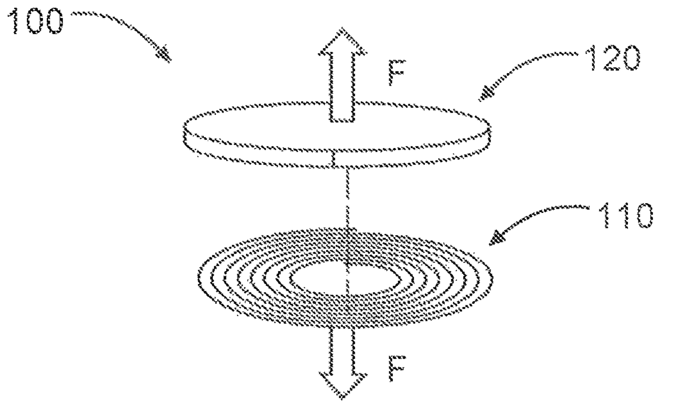
FIG. 1 is a schematic representation of a Thomson coil based actuator in accordance with the disclosure.

FIG. 1 sketches schematically a representation of a Thomson coil based actuator 100. The magnetic field created by a current flowing through the flat coil 110 induces eddy currents inside of the conductive plate 120. The resulting repulsive electromagnetic forces F lead to the motion of the plate away from the coil.

Figure 2:
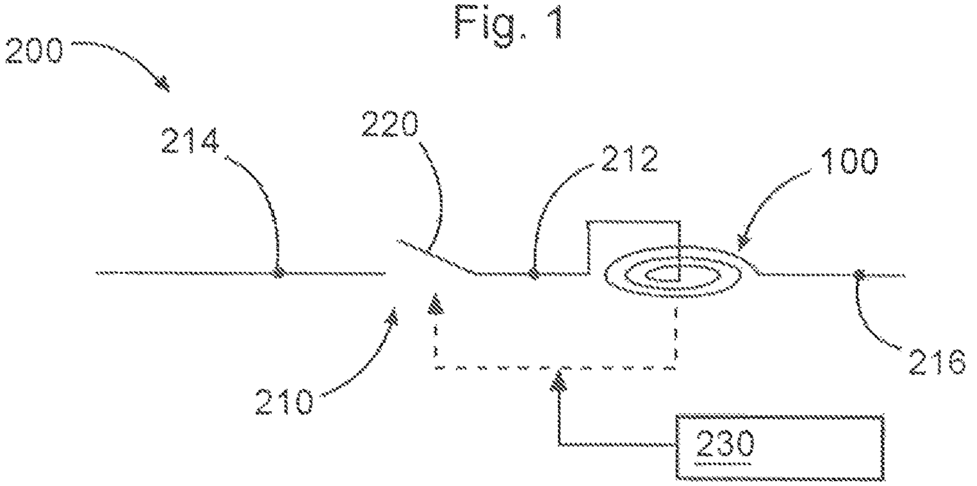
FIG. 2 is a diagram of one embodiment for a passive Thomson coil based actuator in accordance with the disclosure.

FIG. 2 sketches schematically a representation of an implementation of the passive Thomson coil system 100 as part of the first actuator with a coupling 230 between the Thomson coil system and the mechanical switch 210. The mechanical switch 210 comprises a first conductor 212 and the second conductor 214 and a conductive bridge 220.

Figure 3:
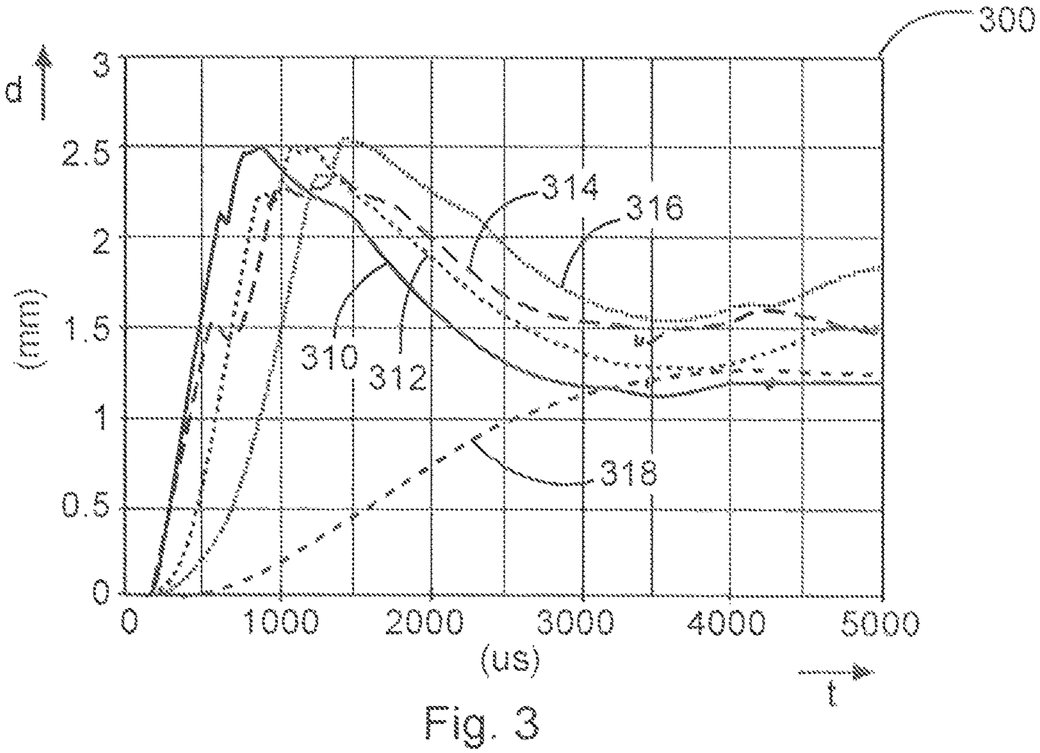
FIG. 3 is a graph showing experimental travel curves for a conductive plate of a Thomson coil-based actuator in accordance with the disclosure.

FIG. 3 provides a diagram 300 showing experimental travel curves 310, 312, 314, 316, 318 for the moving conductive plate 120 of a Thomson coil based actuator 100. The current change rates dI/dt range between 1 and 21 kA/ms (1 kA/ms: (318), 3 kA/ms: (316), 7 kA/ms: (314), 15 kA/ms: (312), 21 kA/ms: (310)). It clearly appears that the slower the dI/dt, the slower the acceleration of the conductive plate, and the longer it takes to reach the end position (between 1 and 1.5 mm in this example). The contacts are latched in the open position for the shown measurements.

Figure 4:
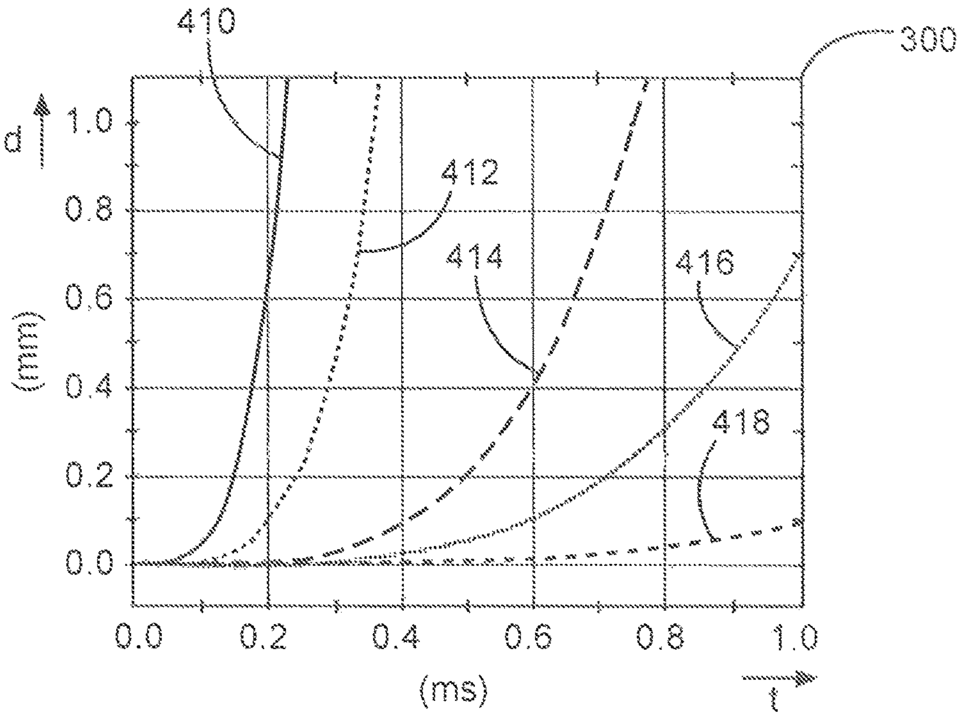
FIG. 4 is a graph showing travel curves of a conductive plate of a Thomson coil-based actuator for different dI/dt determined by simulation calculations in accordance with the disclosure.

FIG. 4 provides a diagram 400 showing travel curves (200 kA/ms: (410), 10 kA/ms: (412), 5 kA/ms: (414), 2.5 kA/ms: (416), 1 kA/ms: (418)), of the moving plate of a Thomson coil based actuator for different current change rates dI/dt determined by simulation calculations.

Figure 5:
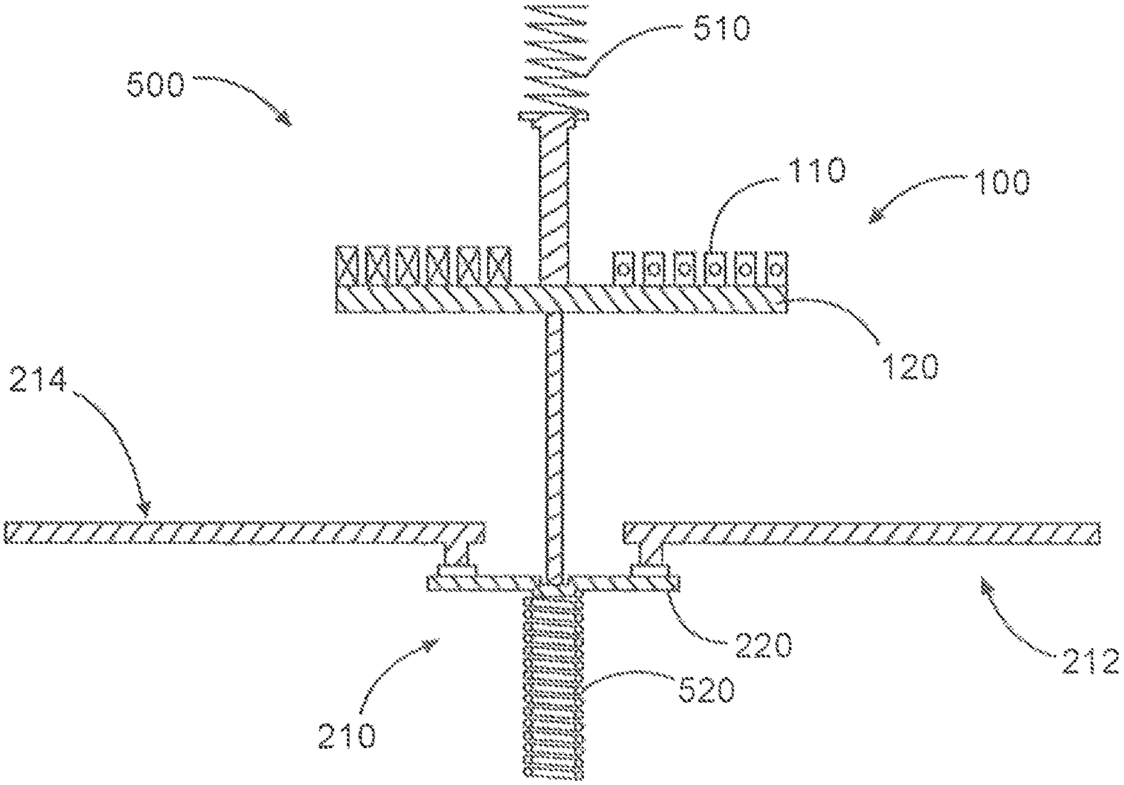
FIG. 5 is a sectioned schematic drawing of a switch system in accordance with the disclosure.

FIG. 5 sketches a schematic drawing of an example of a switch system 500.

The passive Thomson coil system of FIGS. 5, 6 and 7 is already described above, while the spring system is described together with the figures.

The examples shown in FIGS. 5, 6 and 7 are an illustration of the concept of combining a Thomson coil based system 100, including a coil 110 and a conductive plate 120, with a spring system 510. For large current change rates dI/dt, the Thomson plate 120 actuates quickly and opens the conductive bridge 220. At slow current change rates dI/dt, where the Thomson coil based system 100 is inefficient, the loaded spring system 510 pushes the Thomson plate 120 to open the conductive bridge 220 after unlocking the loaded spring system 510 by the latch system. A conductive plate spring 520 may give a necessary contact force for the conductive bridge 220 in closed position. The mechanical connection between the Thomson conductive plate 120 and the spring system 510 should be loose, i.e. the Thomson conductive plate 120 can move independently of the loaded spring 510.

The switch system 500, 600, 700 may be configured to clip the pushing rail in the end position, or by directly ensuring that the unlocked released spring system 510 keeps the open position. It may be noted that the first actuator based on a Thomson coil system 100 may have geometry or shape which is more complex than in the simple schematics of FIG. 1.

With the configuration of the switch system 500 of FIG. 5, the loaded spring 510 may push onto the Thomson conductive plate 120. In the presence of a large current change rate dI/dt the Thomson conductive plate 120 opens the conducting path between the first conductor 212 and the second conductor 214 provided by the conductive bridge 220 of the mechanical switch 210, while the loaded spring 510 may follow a few milliseconds later, i.e. not contributing to the opening of the conducting path. In the case of a slow opening, because of the small rate of change of the current, the released unlatched loaded spring 510 pushes the Thomson conductive plate 120 until the requested gap is reached.

The mechanical connection between the Thomson conductive plate 120 and the spring system 510 may be loose, i.e. the Thomson conductive plate 120 can move independently of the spring system 510. The latch system is not shown here.

The contact spring 520 may provide the needed force to keep the conductive bridge 220 in mechanical and electrical contact with the first 212 and second conductor 214.

FIGS. 6*a* and 6*b* sketches a schematic drawing of another example of a switch system 600, drawn from different side view directions perpendicular to each other. The first actuator including a Thomson coil system 100 as well as the spring system 520 (not shown here) is comparable to the example of the switch system 500 as described with respect to FIG. 5.

The main difference between switch system 600 and 500 is that the spring system 510 indicated by the force arrows 510 is mechanically coupled to the conductive bridge 220 via a pushing rail 610.

The pushing rail 610 is guided within slits (not shown here). The spring system is not shown but can be placed in the third dimension.

FIGS. 7*a* and 7*b* sketch a schematic drawing of another example of a switch system 700, drawn from different side views directions perpendicular to each other. This example of the switch system 700 is a similar configuration as shown in FIG. 6, apart from the fact that the Thomson conductive plate does not push to open the contacts but pulls to open the contacts.

In the case of very slow change rate of current dI/dt (<1 kA/ms), as occurring in the case of overload currents for instance, forces acting on a conductive plate of a Thompson coil used as part of a switch, in accordance with the present disclosure, are not sufficient to push it into the open position.

This is illustrated by the experimental values in FIG. 3 and by the simulations shown in FIG. 4, the larger the dI/dt, the faster a given gap distance is reached.

Accordingly, a switch system is needed that changes fast from a conductive to a nonconductive state for high current change rates dI/dt, but also changes to a nonconductive state for high currents having a low current change rate.

The idea underlying the embodiments described herein is to combine a passive Thomson coil based actuator, which acts essentially for high current change rates dI/dt (typically >1kA/ms) in combination with a spring system, which acts essentially for the cases with low current change rates dI/dt (typically <1 kA/ms).

According to an aspect of the present disclosure, the mechanical switch is mechanically coupled to the first actuator and/or the second actuator.

According to an aspect of the present disclosure, the Thomson coil system is a passive Thomson coil system. That means that the Thomson coil system is based on a passive Thomson coil.

The dependency on a property of an electrical current for changing the state of the mechanical switch may be achieved by a configuration of the first actuator, based on a Thomson coil system, changing the mechanical switch state depending on the current change rate (dI/dt), and it may be a configuration of the second actuator changing the mechanical switch state depending on a threshold value of the electrical current passing through the mechanical switch.

That means using other words, if the first actuator is based on a passive Thomson coil system, the actuation of the first actuator is depending on the current change rate dI/dt. If the dI/dt is too slow, then the Thomson coil system can hardly open the mechanical switch. Therefore, a loaded spring actuator is provided reacting slower than the first actuator, which is based on a passive Thomson coil system, for large current change rates dI/dt.

A Thomson coil system represents a class of fast actuators that have been developed for switching operations. As shown in FIG. 1 they include a flat coil with a conductive plate parallel to the coil. A current flowing through the coil creates a magnetic field that induces eddy currents into the plate, leading to large repulsive electromagnetic forces that can be used for actuation. In particular, in switching applications, these forces are used to promptly separate the contacts of the mechanical breaker. Thomson coil based actuators may present structures more complex than shown in the simple sketch of FIG. 1.

This switch system provides an opening velocity of the contacts depending on a current change rate dI/dt for the high current change rates, due to the first actuator, which is based on a Thomson coil system. Because of the second actuator based on a spring loaded system, where its actuation may depend on an amount of the electrical current, which is independent of the current change rate dI/dt, this switch system provides change of the state of the mechanical switch including slow current change rates dI/dt due to the use of a spring system. The opening velocity by the loaded spring system is a function of the spring stiffness, the spaces and tolerances between the various moving parts, as well as of the mass of the moving parts, which can be fast for a correctly designed system, resulting in an opening velocity of the spring system reaching an opening gap of the mechanical switch of 1 mm in a time range of about 2 ms.

Advantageously, the switch system as described is able to change to the nonconductive state in respect to a full spectrum of faulty currents, being extremely quick for the large current change rates dI/dt and able to toggle to the nonconductive state on over-currents as well, where some more time (some ms) is allowed for reaction.

Such a switch system combining two different actuators provides one system to handle faulty currents as well as smaller over-currents and the switch system as claimed includes the functionality to be operated manually, thereby avoiding an additional switch to save space and cost related to an additional switch for manual operation.

The latch system for locking the loaded spring system may be simply constructed using different possible unlock mechanisms and the switch system may be constructed to additionally lock in an open nonconductive end position.

If the spring system is designed to reach an open gap of 1 mm in about 2 ms, then it can be seen from FIG. 3 that for large dI/dt the Thomson plate will actuate first, as expected, and then the slower spring system will still act "fast" enough to hold respectively lock the contacts in the full open position.

Advantageously, the fast opening of the switch system on high change of current rates dI/dt may interrupt the fault current of direct current (DC) systems quickly based on the Thomson coil system, and in addition may allow coordination with other protective devices such as fuses for instance. Whereas, slower change of current rates dI/dt, such as over currents, may be handled successfully by the loaded spring actuator.

According to an aspect of the present disclosure, the mechanical switch comprises a first conductor, configured to be on a first electrical potential and a second conductor, configured to be on a second electrical potential and a conductive bridge, wherein the conductive bridge is configured to be in electrical contact with the first conductor and the second conductor for the conductive state, and without electrical contact with at least one of the conductors for the nonconductive state.

The conductive bridge may be separate from the first and second conductor and/or the conductive bridge may be part of one of the conductors. That means the conductive bridge may move on its own and/or the conductive bridge may be continuously be electrically and mechanically connected to one of the contacts.

Using other words, the mechanical switch may, e.g., be a mechanical switch with one fix contact and one moving contact parallel to each other, but includes all other types of mechanical switches.

For instance the first actuator and the second actuator may be coupled to the conductive bridge to increase the distance between the conductive plate and the first and/or the second conductor if the actuator is triggered by the electrical current passing the mechanical switch and by this break a galvanic contact between the first and second conductor.

Advantageously, the mechanical switch of the switch system may have a simple construction.

According to an aspect of the present disclosure, the conductive bridge is retained in the conductive state position by a closing spring.

Such a closing spring may provide the force for a solid electrical contact between the conductive bridge and the respective conductors of the mechanical switch.

According to an aspect of the present disclosure, the first actuator is configured to change the conductive state of the mechanical switch, if a rate of change of the current passing the mechanical switch is beyond a current change limit.

The change of the conductive state of the mechanical switch may be a change from the conductive state to the nonconductive state. The change of the conductive state of the mechanical switch by the first actuator may be provided by a mechanical coupling of the first actuator with the mechanical switch. As an example the first actuator may be mechanically coupled to the conductive plate to increase the distance between the conductive bridge and at least one of the conductors to toggle the mechanical switch from the conductive to the nonconductive state.

Because the first actuator is based on a Thomson coil system it follows that the first actuator provides the sensitivity to the rate of change of the current.

Advantageously there is no sensor needed to provide this functionality of the first actuator.

According to an aspect of the present disclosure, the electrical current passing through the mechanical switch passes through a Thomson coil of the Thomson coil system to drive the first actuator changing the mechanical switch to change the state.

To pass the electrical current of the mechanical switch through the Thomson coil provides a simple system of actuation.

According to an aspect of the present disclosure, the second actuator is configured to change the state of the mechanical switch if an amount of the electrical current passing through the mechanical switch exceeds a current value limit. That means if an electrical current passing through the mechanical switch exceeds a current threshold the second actuator will change the state of the mechanical switch because of its configuration.

In this way the switch system can be adapted to faulty currents with a low current change rate but with an amount of the electrical current passing through the mechanical switch which exceeds a current value limit.

According to an aspect of the present disclosure, the latch system of the second actuator is configured to unlock the loaded spring if the amount of the electrical current passing through the mechanical switch exceeds a current value limit.

In this embodiment, the second actuator may interact with the mechanical switch to change from a conductive state to a nonconductive state if the loaded spring is released by unlocking the latch depending on an amount of electrical current, which provides the advantage that for toggling the state of the mechanical switch itself no electrical energy from the circuitry has to be provided.

According to an aspect of the present disclosure, the latch system comprises a bimetallic strip, wherein the latch system is configured to at least partially pass the electrical current passing the mechanical switch through the bimetallic strip in order to unlock the loaded spring in case the current is beyond a current value limit.

A bimetallic strip is used to convert a temperature change into mechanical displacement. The strip consists of two strips of different metals which expand at different rates as they are heated, for instance steel and copper and/or steel and brass. The different expansions force the flat strip to bend one way if heated and in the opposite direction if cooled below its initial temperature. The metal with the higher coefficient of thermal expansion is on the outer side of the curve when the strip is heated and on the inner side when cooled. The current beyond a current value limit may increase the temperature of the bimetallic strip if passing the bimetallic strip.

Such a bimetallic strip provides a simple construction for the latch system to lock the loaded spring.

According to an aspect of the present disclosure, the latch system comprises a magnetic shape memory alloy system and an electromagnetic coil, wherein the latch system is configured to at least partially pass the electrical current passing the mechanical switch through the electromagnetic coil changing the shape of the magnetic shape memory alloy system to unlock the loaded spring in case the current is beyond a current value limit.

Magnetic Shape Memory Alloys (MSM) change their shape under the influence of external magnetic fields and may comprise NiMnGa. In combination with an electromagnetic coil such a magnetic shape memory alloy system provides a simple and reliable latch system to keep the loaded spring in the lock position and release the spring if a magnetic field is provided to the magnetic shape memory alloy.

Alternatively, the electromagnetic coil of the latch system changing the shape of the memory alloy may be provided by electrical current, where the latch system is configured to provide an electrical current passing through the electromagnetic coil depending on a measurement result of a current measurement sensor measuring the electrical current passing the mechanical switch.

According to an aspect of the present disclosure, the latch system is based on an electromechanical system. Such an electromechanical system may be, for instance, an electrical relay. That means that the loaded spring of the second actuator may be locked by an electromechanical system, which is configured to release the loaded spring if at least partially the electrical current and/or a current which is proportional the current passing through the mechanical switch, passes through the electromechanical system to release the loaded spring if the current through the electromechanical system exceeds a specific limit.

According to an aspect of the present disclosure, the latch system comprises a current measurement sensor measuring the electrical current passing the mechanical switch, wherein the latch system is configured to release the loaded spring in case the current passing through the mechanical switch is beyond a current value limit.

According to an aspect of the present disclosure, the current measurement sensor comprises a shunt and/or a Rogowski coil and/or a Hall sensor.

The sensors provide a simple and reliable way to measure the electrical current.

According to an aspect of the present disclosure, the first actuator and the second actuator are configured to each push or alternatively pull the contact bridge of the mechanical switch to change the state of the mechanical switch to the nonconductive state.

Advantageously this gives a huge number of construction possibilities for the switch system.

That means that the first actuator as well as the second actuator may be configured to push or alternatively pull the contact bridge. That means that an actuator may push and the other actuator may pull the contact bridge or both may actuate the same way by pushing or pulling the contact bridge to change the state of the mechanical switch to the nonconductive state.

According to an aspect of the present disclosure, the first and/or the second actuator of the switch system as described above is configured to change the state of the mechanical switch manually and/or remotely, based on a trigger signal, impacting the first actuator and/or the second actuator.

The triggering signal may be an electrical signal impacting the first and/or second actuator.

In addition to the release mechanisms described above, i.e., by a change of the current rate or a current above a certain current limit, the switch system may be configured to be opened or closed manually, e.g. by releasing the loaded spring manually to open the mechanical switch and/or by manual loading the spring to close the mechanical switch.

Additionally, or alternatively, the switch system may be configured to be opened remotely, based on a trigger signal, e.g. by releasing the loaded spring remotely, to open the mechanical switch, using the latch system, which may be configured to release the loaded spring based on the trigger signal.

Additionally, or alternatively, the switch system may be configured to be closed remotely, based on a trigger signal, e.g. by loading the spring of the second actuator remotely, to close the mechanical switch, using an electromechanical system, which may be configured to load the spring, based on the trigger signal.

The manual and/or remote control of the switch system allows to disconnect and/or connect the mechanical switch of the switch system as part of an electrical circuit as a contactor.

A use of the switch system according to one of switch systems as described above is provided to protect a battery energy storage system and/or electrical vehicles and/or electrical vehicle chargers or data-centers in case of fault currents and/or short-circuit currents and/or overload currents.

The switch system may be used for protection of a battery energy storage system, but also for instance for data centers and/or electrical vehicle charging systems. Respectively an application of the switch system as described may relate to low and medium voltage switching.

To explain in more detail the second actuator of the switch system described above, which comprises a loaded spring system locked by a latch system, it is compared here with a different second actuator, which is not part of the switch system as described within this specification. Such a different second actuator may be based on an electromechanical system, which is configured to change the state of the mechanical switch directly. That means that the electromechanical system may be configured and mechanically coupled to the mechanical switch to force the mechanical switch into an open position if an amount of the electrical current passing the mechanical switch exceeds a current value limit.

By this, a switch system with a first actuator, which is configured to change the state of the mechanical switch based on a Thomson coil system, the different second actuator may be based on an electromechanical system in such a way that without a loaded spring the second actuator is configured to directly force the mechanical switch to an open position. For instance, the electromechanical system may move a magnetic device mechanically coupled to the mechanical switch by use of magnetic fields to change from a first position to a second position to open the mechanical switch.

Alternatively or additionally, the different second actuator may be configured to change the state of the mechanical switch to close the mechanical switch accordingly by a trigger signal.

All references, including publications, patent applications, and patents, cited herein are hereby incorporated by reference to the same extent as if each reference were individually and specifically indicated to be incorporated by reference and were set forth in its entirety herein.

The use of the terms “a” and “an” and “the” and “at least one” and similar referents in the context of describing the invention (especially in the context of the following claims) are to be construed to cover both the singular and the plural, unless otherwise indicated herein or clearly contradicted by context. The use of the term “at least one” followed by a list of one or more items (for example, “at least one of A and B”) is to be construed to mean one item selected from the listed items (A or B) or any combination of two or more of the listed items (A and B), unless otherwise indicated herein or clearly contradicted by context. The terms “comprising,” “having,” “including,” and “containing” are to be construed as open-ended terms (i.e., meaning “including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. A switch system, comprising:

a mechanical switch for electrical currents, the mechanical switch comprising a conductive state and a non-conducive state;

a first actuator configured to change a state of the mechanical switch, wherein an actuation of the first actuator is based on a Thomson coil system;

a second actuator configured to change the state of the mechanical switch, the second actuator comprising a loaded spring system locked by a latch system;

a conductive bridge between a first conductor and a second conductor retained in a conductive state position by a conductive plate spring, wherein each of the first actuator and the second actuator is configured to change the state of the mechanical switch depending on a property of an electrical current passing the mechanical switch, wherein the loaded spring system is configured to move independently of a Thomson conductive plate of the Thomson coil system, wherein the loaded spring system is configured to push the Thomson conductive plate to open the conductive bridge after the loaded spring is unlocked by the latch system.

2. The switch system according to claim 1, wherein the mechanical switch comprises:

a first conductor configured to be on a first electrical potential;

a second conductor configured to be on a second electrical potential; and a conductive bridge configured to be in electrical contact with the first conductor and the second conductor;

wherein the conductive bridge is configured to be without electrical contact with at least one of the first and second conductors when the mechanical switch is disposed in the nonconductive state.

3. The switch system according to claim 2, wherein the conductive bridge is retained in the conductive state position by a contact spring.

4. The switch system according to claim 1, wherein the first actuator is configured to change the conductive state of the mechanical switch when a rate of change of the current passing the mechanical switch is beyond a rate of current change limit.

5. The switch system according to claim 1, wherein the electrical current passing through the mechanical switch passes through a Thomson coil of the Thomson coil system to drive the first actuator to move the mechanical switch between the conductive and non-conductive states.

6. The switch system according to claim 1, wherein the second actuator is configured to change the state of the mechanical switch when an amount of electrical current passing through the mechanical switch exceeds a current value limit.

7. The switch system according to claim 1, wherein the latch system of the second actuator is configured to unlock the loaded spring when the amount of electrical current passing through the mechanical switch exceeds a current value limit.

8. The switch system according to claim 1, wherein the latch system comprises a bimetallic strip, wherein the latch system is configured to at least partially pass the electrical current passing through the mechanical switch through the bimetallic strip to unlock the loaded spring when the current passing through the mechanical switch exceeds a current value limit.

9. The switch system according to one claim 1, wherein the latch system comprises a magnetic shape memory alloy system and an electromagnetic coil, wherein the latch system is configured to at least partially pass the electrical current passing through the mechanical switch through the electromagnetic coil changing the shape of the magnetic shape memory alloy system to unlock the loaded spring when the current passing through the mechanical switch exceeds a current value limit.

10. The switch system according to claim 1, wherein the latch system comprises a current measurement sensor measuring the electrical current passing through the mechanical switch, wherein the latch system is configured to unlock the loaded spring when the current passing through the mechanical switch exceeds a current value limit.

11. The switch system according to claim 10, wherein the current measurement sensor comprises at least one of a shunt, a Rogowski coil, and a Hall sensor.

12. The switch system according to claim 1, wherein the latch system is based on an electromechanical system.

13. The switch system according to claim 1, wherein each of the first actuator and the second actuator at least one of pushes or pulls a contact bridge of the mechanical switch to change the state of the mechanical switch to the non-conductive state.

14. The switch system according to claim 1, wherein at least one of the first actuator and the second actuator is configured to change the state of the mechanical switch manually and/or remotely based on a trigger signal impacting the first and/or the second actuator.

* * * * *